Sept. 29, 1964  R. A. HEATON  3,150,810
MOTION PICTURE PROJECTORS
Filed Jan. 21, 1963

INVENTOR.
RAYMOND A. HEATON
BY
Richards & Geier
ATTORNEYS

United States Patent Office 3,150,810
Patented Sept. 29, 1964

3,150,810
MOTION PICTURE PROJECTORS
Raymond A. Heaton, New York, N.Y., assignor to Societa Internazionale Fonovisione—S.I.F., Rome, Italy
Filed Jan. 21, 1963, Ser. No. 252,765
4 Claims. (Cl. 226—78)

This invention relates to motion picture projectors and refers more particularly to a novel drive of such projectors. The invention is applicable to projectors of all types, including those for use in homes and theaters, as well as to projectors provided with means for selecting for viewing one of a plurality of films located within the projector.

In prior art constructions the film drive sprocket and the sound pickup drum were fixed in their locations within the projector and the film had to be moved into contact with these parts. It was found that this arrangement is not always satisfactory since it may cause improper movement or even breakage of the film.

It is, therefore, an object of the present invention to improve prior art drives of motion picture projectors.

Another object of the present invention is to provide means in a motion picture projector for moving the film drive sprocket and sound pickup drum into engagement with the film being projected.

Yet another object is to provide a single carrier member for supporting and moving both the film drive sprocket and the sound pickup drum of a motion picture projector into engagement with the film being projected.

A further object is the construction of a device which provides both optical and magnitic pickup from the film at a standard number of frames from the point of optical projection.

Other objects of the present invention will become apparent during the course of the following specification.

In achieving these and other objects of the present invention, it was found advantageous to support a movable carrier arm on a wall of a motion picture projector chassis, suitable driving means also being provided for reciprocating the carrier arm upwardly and downwardly relatively to the chassis wall. The carrier arm supports a film drive sprocket and beneath the drive sprocket, a sound pickup drum, both of which are rotatable on the carrier arm. A pair of roller support arms are mounted on pivots on the chassis wall and are arranged symmetrically on each side of the path of movement of the carrier arm. Film guide rollers are supported rotatably at the upper ends of the roller support arms. The lower end of the carrier arm is provided with a shoulder-like projection which when the carrier arm is moved downwardly to an operative position, engages the roller support arms causing them to pivot inwardly towards each other thereby moving the film guide rollers into contact with the film being projected. As the carrier arm is moved downwardly to an operative or projecting position, it carries the film coming from the optical projection portion of the projector down in a loop, the film in the loop threading itself onto the feed sprocket and around the sound pickup drum. In addition to the abovementioned film guide rollers, other roller means are provided on the chassis for properly guiding the film. Furthermore, locking means are provided for locking the carrier arm in its operative or projecting position. When the carrier arm is moved upwardly from its operative position, the locking means is automatically unlocked. The upward movement of the carrier arm moves the shouldered projection thereon out of contact with the roller support arms, and springs connected to the latter and to the chassis wall swing the roller support arms outwardly of the carrier arm to give sufficient clearance for the carrier to pass by the film guide rollers.

The invention will appear more clearly from the following detailed description when taken in conjunction with the accompanying drawings showing, by way of example, a preferred embodiment of the inventive concept.

Figure 4:
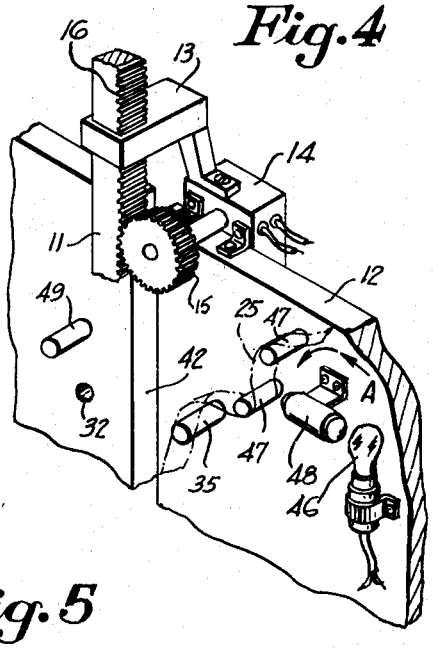
Figure 5:
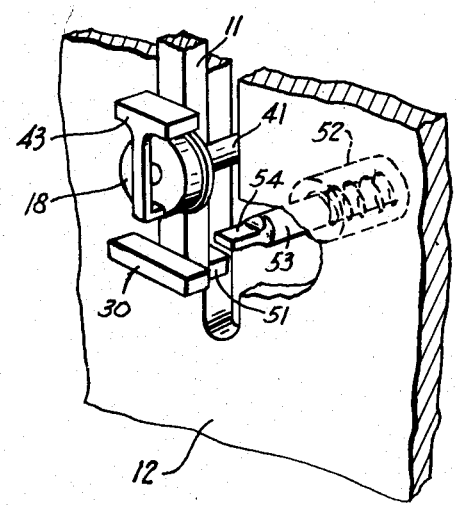

FIGURE 4 is a perspective view of a portion of a motion picture projector chassis showing the manner in which the film drive sprocket and sound pickup device of the present invention is supported on one chassis wall thereof; and FIGURE 5 is a fragmentary perspective view of a lower portion of the carrier arm showing another form of locking device for locking the carrier arm in an operative position.

Throughout the specification, like reference numerals are used to indicate like parts.

The film drive sprocket and sound pickup device 10 of the present invention may be used on motion picture projectors of almost any type. It comprises a movable carrier arm 11 which is supported on a wall 12 of a motion picture projector chassis as shown in FIGURE 4. Referring to FIGURE 4 in greater detail, the carrier arm 11 is slidably supported on chassis wall 12 by means of a bracket 13 which in turn is supported on a reversible electric motor 14. The electric motor 14 drives a pinion 15 which meshes with the rack teeth 16 cut on one side of carrier arm 11. Thus, the carrier arm 11 may be slidably moved upwardly and downwardly with respect to the chassis wall 12.

Figure 1:
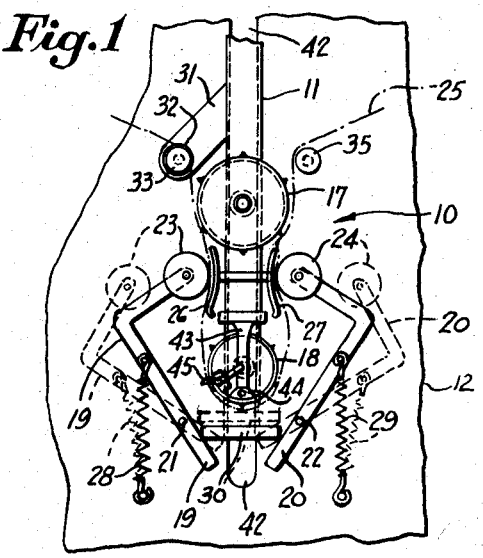
FIGURE 1 is a front elevational view of a combined film drive sprocket and sound pickup device constructed in accordance with the principles of the present invention, the device being shown mounted on a wall of a motion picture projector.
Figure 2:
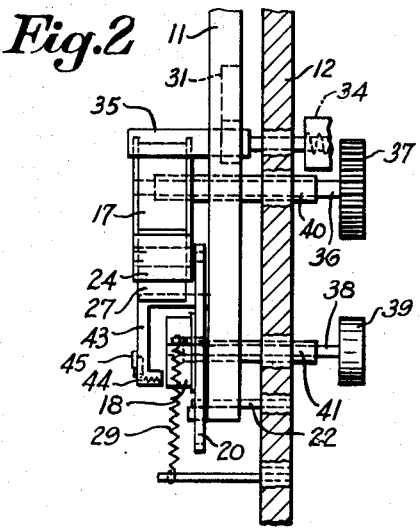
FIGURE 2 is an end elevational view of the construction shown in FIGURE 1.

A film drive sprocket 17 is rotably mounted on the carrier arm 11 and a sound pickup drum 18 is also mounted rotatably on the carrier arm 11 a distance below drive sprocket 17 (FIGS. 1 and 2). A pair of roller support arms 19 and 20 are mounted on pivots 21, 22, respectively, and are arranged symmetrically on each side of the path of movement of the carrier arm 11 so that when the carrier arm is moved downwardly to an operative or projecting position, the roller support arms may be pivoted to bring film guide rollers 23, 24 into engagement with the film 25 being projected. In order to aid in proper guidance of the film 25 as it passes around the drive sprocket and sound drum, guide shoes 26 and 27 are firmly supported on carrier arm 11 and cooperate with film guide rollers 23, 24, respectively, in holding the film in proper position. The roller support arms 19 and 20 are normally held in the open position shown in broken lines in FIGURE 1 by means of compression springs 28, 29, respectively. Roller support arms 19 and 20 are pivoted to the closed position (shown in solid lines in FIGURE 1) for bringing guide rollers 23, 24 into engagement with the film 25 by means of a shoulder-like projection 30 firmly connected to the lower end of carrier arm 11. When carrier arm 11 is moved downwardly to an operative position, the shoulder-like projection 30 strikes the support arms 19 and 20 and pivots them inwardly toward each other as shown in FIGURE 1.

Figure 3:
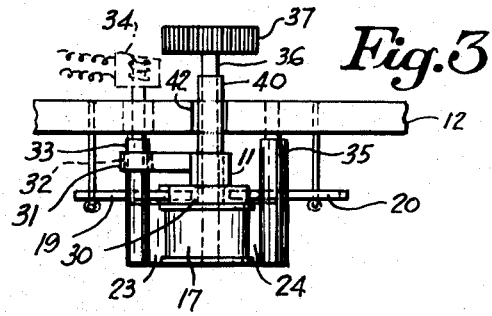
FIGURE 3 is a top plan view of FIGURE 1.

Locking means is provided for locking carrier arm 11 after it has moved down to an operative position. The locking means comprise an arm piece 31 which is firmly connected to the carrier arm 11 and has a bore hole 32 adjacent its end. Cooperating with the arm piece 31 is a locking bolt 33 which is rotatably and slidably supported in chassis wall 12 and which is actuated by a solenoid 34. Locking bolt 33 does not engage arm piece 31 until the carrier arm 11 has fully moved downwardly to its operative position. Once this operative position is achieved, however, solenoid 34 is actuated and forces locking bolt from within and behind chassis wall 12 and through bore hole 32 in arm piece 31. As seen particularly in FIGURE 3, the locking bolt 33, since it is rotatably supported, also acts as a film guide. A similar film guide 35 is also rotatably mounted in chassis wall 12 on the other side of carrier arm 11. After the film 25 has been projected and carrier arm 11 is to be raised to an inoperative position, locking bolt 33 will slide out of arm piece 31 upon de-energizing solenoid 34. The particular control means which may be employed for energizing and de-energizing solenoid 34, for example, a micro-switch, are not shown as such means are well within the knowledge and understanding of those skilled in the art.

The drive sprocket 17 is connected by shaft 36 to a gear 37 which in turn meshes with a driving member (not shown) supported in the projector chassis when carrier arm 11 is lowered to an operative position. Likewise shaft 38 connects sound drum 18 with flywheel 39 which is carried in the projector chassis and may be one well known in the art and which is used for stabilizing film travel.

Both shaft 36 and shaft 38 are enclosed by bushings 40 and 41, respectively, which are loosely supported on the shafts and in carrier arm 11 and which serve for guiding the carrier arm 11 in slot 42 of chassis wall 12 during downward travel.

An angle bracket 43 is firmly connected to carrier arm 11 just above sound drum 18 and extending outwardly therefrom and downwardly in front of the sound drum. The angle bracket 43 supports a magnetic pickup head 44 for picking up magnetic sound impressions from the film 25, and a photo cell 45 for reading optical sound characters. The construction and function of both the magnetic pickup head 44 and the photo cell 45 are well known in the art.

The operation of the device of the present invention will be more fully understood by further reference to FIGURES 1 and 4 of the drawings. As seen in FIGURE 4, the film 25 which is stored on an unwind reel (not shown) traverses a course (arrow A) in the motion picture projector which first takes it past the optical projection means which comprises a lamp 46, guide rollers 47 and a prism or lens 48.

Let it be assumed that the film 25 has been first threaded in the motion picture projector from an unwind reel, through the optical projection means and onto a take-up roller (not shown). The carrier arm 11 is in a raised up or inoperative position so that the film 25 will span the film guide 35 and another guide 49 located on the other side of chassis guide slot 42 and above bore hole 32 wherein is supported the locking bolt 33. When it is desired to lower carrier arm 11 to an operative position in order to project the film, motor 14 will be energized to turn pinion 15 driving carrier arm downwardly. As carrier arm 11 is lowered, the sound drum 18 will engage and carry the film 25 downwardly in a loop, the film threading itself onto the sound drum. The shoulder-like projection 30 of carrier arm 11 engages roller support arms 19 and 20 as it descends, causing them to pivot inwardly towards each other so that when carrier arm 11 is in its fully lowered operative position, the film guide rollers 23 and 24 will hold the film 25 against guide shoes 26 and 27. This action also assures that the film will properly engage the teeth on drive sprocket 17 with the guide shoes 26, 27 being further utilized to limit the amount of sprocket teeth actually engaged by the film. Once the carrier arm 11 has reached its operative position, solenoid 34 is energized causing locking bolt 33 to slide through bore hole 32 in arm piece 31 which action locks the carrier arm in position. With the carrier arm 11 in operative position, gears 37 and 39 engage drive gears (not shown) in the chassis and the drive sprocket and sound drum will rotate for projecting the film.

As the film 25 moves around sound drum 18 the sound intelligence data impressed thereon will pass over magnetic pick-up head 44 and appropriate conversion of this data to audio takes place in a manner well known to persons skilled in the art. On the other hand, the photo cell 45 may also be used to pick up the sound portion of the picture projection in which case the conversion to audio would take place as the film passes over the photo cell.

Inasmuch as the optical projection of the film through prism 48 occurs some distance before sound pickup, the device of the present invention is suited for use in known projectors for projecting film on which the sound track is in advance of the visual scene frame to which it is related. This distance may be a standard one as, for example, eight picture frames.

After the film 25 has been projected, solenoid 34 is de-energized unlocking bolt 33 from carrier arm 11. Simultaneously, motor 14 is operated in a reverse direction raising carrier arm 11 upwardly to an inoperative position.

The electrical connections for unrolling the film and for operating the motor 14, the solenoid 34, the drive for the gears 37 and 39, the lamp 46, the magnetic pick-up head 44 and the photo cell 45 have not been described or illustrated herein since they do not constitute a part of the present invention. For projectors selectively showing one of a plurality of films they may be of the type disclosed in U.S. Patent No. 3,081,668 granted to Raffaello Nistri on March 19, 1963.

Figure 5 illustrates a different manner of locking the carrier arm 11 in an operative position. In this embodiment a shoulder 51 is firmly carried by the carrier arm 11 on the side opposite shoulder like projection 30. A solenoid 52 is mounted on the chassis wall 12 behind the slot therein. The armature 53 of the solenoid has a flat head 54 which when the solenoid is energized hangs up on top of shoulder 51 and prevents the carrier arm 11 from being moved out of its operative position.

While there is above disclosed but some embodiments of the motion picture projector drive of the present invention, it is possible to produce still other embodiments without departing from the inventive concept herein disclosed.

What is claimed is:

1. In a motion picture projector adapted to contain a length of film and having an upright chassis wall, a film driving and sound pickup device comprising an elongated carrier arm slidably supported on said chassis wall, a film drive sprocket rotatably supported on said carrier arm, a sound drum rotatably supported on said carrier arm below said drive sprocket, means moving said carrier arm downwardly relatively to said chassis wall across the path of the film being projected from an inoperative to an operative position, said sound drum engaging the film and forming a loop out of a portion of the film in said operative position with the film drive sprocket engaging opposite sides of said loop, film guide members swingably supported on said chassis wall on opposite sides of the path of movement of said carrier arm, and means carried by said carrier arm and engaging said film guide means when said carrier arm is moved to an operative position for swinging said film guide members into contact with the opposite sides of said loop whereby said film is maintained in contact with said sound drum and said drive sprocket.

2. In a motion picture projector adapted to contain a length of film and having an upright chassis wall, a film driving and sound pickup device comprising an elongaged carrier arm slidably supported on said chassis wall, a film drive sprocket rotatably supported on said carrier arm, sound drum rotatably supported on said carrier arm below said drive sprocket, means for moving said carrier arm downwardly relatively to said chassis wall across the path of the film being projected from an inoperative to an operative position, said sound drum engaging the film and forming a loop out of a portion of the film in said operative position with the film drive sprocket engaging opposite sides of said loop, film guide members swingably supported on said chassis wall on opposite sides of the path of movement of said carrier arm, means carried by said carrier arm and engaging said film guide members when said carrier arm is moved to an operative position for swinging said film guide members into contact with the opposite sides of said loop whereby said film is maintained in contact with said sound drum and said film drive sprocket, locking means for locking said carrier arm in an operative position, and sound pickup means carried by said carrier arm and located alongside said sound drum and engageable with the film looped around said sound drum.

3. In a motion picture projector adapted to contain a length of film and having an upright chassis wall and a slot extending vertically in said chassis wall, a film driving and sound pickup device comprising an elongated carrier arm slidably supported on said chassis wall, means moving said carrier arm downwardly relatively to said chassis wall from an inoperative raised position across the path of the film being projected to an operative lowered position, a film drive sprocket rotatably supported on said carrier arm, a sound drum rotatably supported on said carrier arm below said drive sprocket, said sound drum engaging the film and forming a loop out of a portion of the film in said operative position with the film drive sprocket engaging opposite sides of said loop, a pair of roller support arms pivoted at one end to said chassis wall and arranged symmetrically on opposite sides of said chassis wall slot, film guide rollers rotatably mounted on said other end of each of said roller support arms, means operated by said carrier arm in said operative position for pivoting said other end of each of said roller support arms in the direction of said chassis wall slot whereby said guide rollers are brought into engagement with and support opposite sides of said loop, locking means supported in said chassis wall and operative when said carrier arm is in its lowered operative position for locking said carrier arm in said lowered operative position, and sound pickup means carried by said carrier arm and located alongside said sound drum and engageable with the film looped around said sound drum.

4. In a motion picture projector adapted to contain a length of film and having an upright chassis wall and a slot extending vertically in said chassis wall and across the path of the film being projected, a film driving and sound pickup device comprising an elongated carrier arm, means supporting said carrier arm slidably on said chassis wall, means for sliding said carrier arm on said chassis wall from an inoperative raised position across the path of the film being projected to an operative lowered position, a film drive sprocket rotatably supported on said carrier arm, a sound drum rotatably supported on said carrier arm below said drive sprocket, said sound drum engaging the film and forming a loop out of a portion of the film in said operative position with the film drive sprocket engaging opposite sides of said loop, a pair of film guide shoes firmly connected to said carrier arm and arranged symmetrically on each side thereof, a pair of roller support arms pivoted at one end to said chassis wall and arranged symmetrically on opposite sides of said chassis wall slot, resilient means connected to said chassis wall and to said support arms and tending to urge the other end of each of said roller support arms away from said chassis wall slot, film guide rollers rotatably mounted on said other end of each of said roller support arms, a shoulder-like projection firmly connected with a lower portion of said carrier arm and adapted to contact said roller support arms when said carrier arm is moved to an operative position for pivoting said other end of each of said roller support arms in the direction of said chassis wall slot whereby said guide rollers press the film being projected against said guide shoes, locking means engageable with said chassis wall and said carrier arm for locking said carrier arm in its operative position, a bracket firmly connected to said carrier arm and having a portion extending outwardly thereof and alongside said sound drum, a magnetic pickup head carried by said bracket, a photo cell connected to said bracket, said magnetic pickup head and said photo cell engaging the film looped around said sound drum, and guide means slidable in said chassis wall slot for guiding the movement of said carrier arm.

References Cited in the file of this patent
UNITED STATES PATENTS

| | | |
|---|---|---|
| 1,427,602 | Kaiser | Aug. 29, 1922 |
| 1,637,378 | Howell | Aug. 2, 1927 |
| 2,978,159 | Gower et al. | Apr. 4, 1961 |
| 3,018,933 | Rookus | Jan. 30, 1962 |